United States Patent
Basson et al.

(10) Patent No.: US 8,103,511 B2
(45) Date of Patent: Jan. 24, 2012

(54) MULTIPLE AUDIO FILE PROCESSING METHOD AND SYSTEM

(75) Inventors: Sara H. Basson, White Plains, NY (US); Brian R. Heasman, Oostduinkerke (BE); Dimitri Kanevsky, Ossining, NY (US); Edward Emile Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/127,874

(22) Filed: May 28, 2008

(65) Prior Publication Data

US 2009/0299748 A1 Dec. 3, 2009

(51) Int. Cl.
*G10L 21/00* (2006.01)
*G10L 11/02* (2006.01)

(52) U.S. Cl. .......... 704/278; 704/201; 704/211

(58) Field of Classification Search .......... 704/278, 704/235, 225, 277, 201, 203, 211, 215; 379/88.05, 379/88.13
See application file for complete search history.

(56) References Cited

U.S. PATENT DOCUMENTS

| | | | | |
|---|---|---|---|---|
| 4,375,083 A * | 2/1983 | Maxemchuk | ............... | 704/278 |
| 5,483,619 A * | 1/1996 | Blanchard | ............... | 704/278 |
| 5,592,588 A * | 1/1997 | Reekes et al. | ............... | 704/278 |
| 5,684,927 A * | 11/1997 | Mirkowicz | ............... | 704/278 |
| 5,692,058 A * | 11/1997 | Eggers et al. | ............... | 381/107 |
| 5,765,134 A * | 6/1998 | Kehoe | ............... | 704/270 |
| 5,930,752 A * | 7/1999 | Kawaguchi et al. | ............... | 704/270.1 |
| 6,138,091 A * | 10/2000 | Haataja et al. | ............... | 704/215 |
| 6,161,087 A * | 12/2000 | Wightman et al. | ............... | 704/215 |
| 6,334,106 B1 | 12/2001 | Mizuno et al. | | |
| 6,591,240 B1 * | 7/2003 | Abe | ............... | 704/278 |
| 7,035,807 B1 * | 4/2006 | Brittain et al. | ............... | 704/278 |
| 7,085,719 B1 * | 8/2006 | Shambaugh et al. | ............... | 704/251 |
| 7,269,264 B2 * | 9/2007 | Gierse | ............... | 381/104 |
| 7,536,303 B2 * | 5/2009 | Yoshizawa et al. | ............... | 704/231 |
| 7,596,234 B2 * | 9/2009 | Lu et al. | ............... | 381/119 |
| 7,904,189 B2 * | 3/2011 | Basson et al. | ............... | 700/94 |
| 7,934,264 B2 * | 4/2011 | Basson et al. | ............... | 726/26 |
| 2003/0004722 A1 | 1/2003 | Butzberger et al. | | |
| 2003/0115066 A1 | 6/2003 | Seeley et al. | | |
| 2004/0049385 A1 | 3/2004 | Lovance et al. | | |
| 2005/0261890 A1 * | 11/2005 | Robinson | ............... | 704/9 |
| 2005/0265554 A1 * | 12/2005 | Walker et al. | ............... | 380/283 |
| 2006/0072727 A1 | 4/2006 | Bantz et al. | | |
| 2007/0028749 A1 * | 2/2007 | Basson et al. | ............... | 84/601 |
| 2008/0147413 A1 * | 6/2008 | Sobol-Shikler | ............... | 704/278 |
| 2009/0031425 A1 * | 1/2009 | Basson et al. | ............... | 726/26 |
| 2009/0210080 A1 * | 8/2009 | Basson et al. | ............... | 700/94 |

* cited by examiner

*Primary Examiner* — Martin Lerner
(74) *Attorney, Agent, or Firm* — Schmeiser, Olsen & Watts; John Pivnichny

(57) ABSTRACT

An audio file generation method and system. A computing system receives a first audio file comprising first speech data associated with a first party. The computing system receives a second audio file comprising second speech data associated with a second party. The first audio file differs from the second audio file. The computing system generates a third audio file from the second audio file. The third audio file differs from the second audio file. The process to generate the third audio file includes identifying a first set of attributes missing from the second audio file and adding the first set of attributes to the second audio file. The process to generate the third audio file additionally includes removing a second set of attributes from the second audio file. The third audio file includes third speech data associated with the second party. The computing system broadcasts the third audio file.

20 Claims, 5 Drawing Sheets

MULTIPLE AUDIO FILE PROCESSING METHOD AND SYSTEM

FIELD OF THE INVENTION

The present invention relates to a method and associated system for processing multiple audio files.

BACKGROUND OF THE INVENTION

Processing multiple data files typically comprises an inefficient process with little flexibility. Accordingly, there exists a need in the art to overcome the deficiencies and limitations described herein above.

SUMMARY OF THE INVENTION

The present invention provides a method, comprising:

receiving, by a computing system from a first audio source, a first audio file, wherein said first audio file comprises an original audio file, wherein said first audio file is generated from a first audio signal, and wherein said first audio file comprises first speech data associated with a first party;

receiving, by said computing system from a second audio source, a second audio file associated with said first audio file, wherein said second audio file is generated from said first audio signal, wherein said first audio source differs from said second audio source, wherein said first audio file differs from said second audio file, and wherein said second audio file comprises second speech data associated with a second party;

after receiving said first audio file and said second audio file, generating by said computing system, a third audio file, wherein said third audio file is generated from said second audio file, wherein said third audio file differs from said second audio file, wherein said generating said third audio file comprises identifying a first set of attributes missing from said second audio file and adding said first set of attributes to said second audio file, wherein said generating said third audio file comprises removing a second set of attributes from said second audio file, and wherein said third audio file comprises third speech data associated with said second party; and broadcasting, by said computing system, said third audio file.

The present invention provides a computing system comprising a processor coupled to a computer-readable memory unit, said memory unit comprising instructions that when executed by the processor implement an audio file generation method, said method comprising;

receiving, by said computing system from a first audio source, a first audio file, wherein said first audio file comprises an original audio file, wherein said first audio file is generated from a first audio signal, and wherein said first audio file comprises first speech data associated with a first party;

receiving, by said computing system from a second audio source, a second audio file associated with said first audio file, wherein said second audio file is generated from said first audio signal, wherein said first audio source differs from said second audio source, wherein said first audio file differs from said second audio file, and wherein said second audio file comprises second speech data associated with a second party;

after receiving said first audio file and said second audio file, generating by said computing system, a third audio file, wherein said third audio file is generated from said second audio file, wherein said third audio file differs from said second audio file, wherein said generating said third audio file comprises identifying a first set of attributes missing from said second audio file and adding said first set of attributes to said second audio file, wherein said generating said third audio file comprises removing a second set of attributes from said second audio file, and wherein said third audio file comprises third speech data associated with said second party; and broadcasting, by said computing system, said third audio file.

The present invention advantageously provides a system and associated method capable of processing multiple data files.

DETAILED DESCRIPTION OF THE INVENTION

Figure 1:
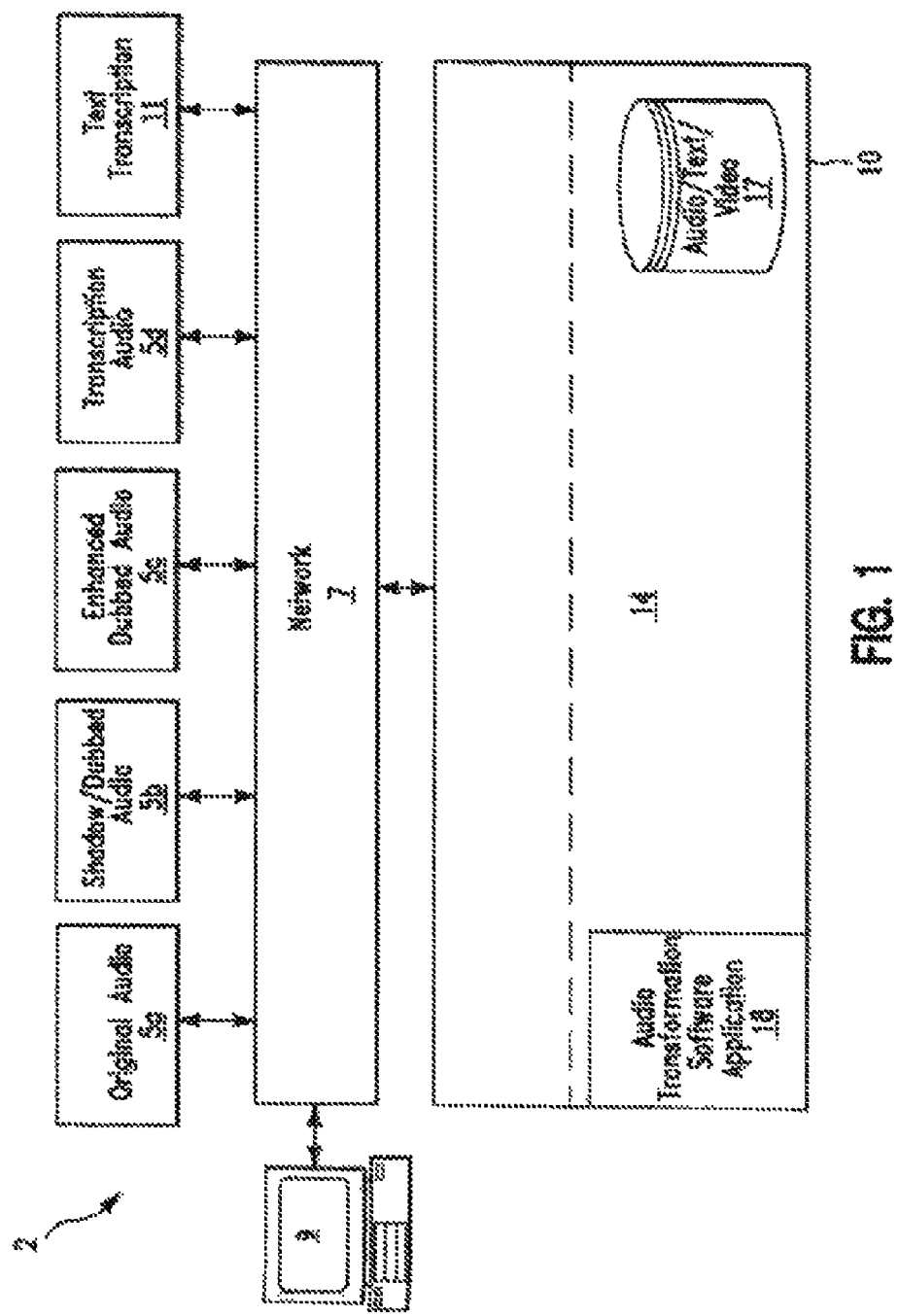
FIG. 1 illustrates a block diagram view of a system for processing multiple audio files, in accordance with embodiments of the present invention.

FIG. 1 illustrates a block diagram view of a system 2 for processing multiple audio files, in accordance with embodiments of the present invention. System 2 performs a process for shadowing an original audio file or audio stream (i.e., comprising speech data associated with a speaker) while simultaneously enabling a dubbing process associated with the original audio file or stream. Dubbing is defined herein as a process for recording or replacing (portions of or an entire portion of) first speech data (i.e., spoken by a first speaker) with second speech data (i.e., spoken by a second speaker). Shadowing is defined herein as a process performed by a person that listens to an original audio file or stream and repeats speech data from the original audio file or stream. A shadowing process may be performed by a shadower (i.e., a person that performs a shadowing process) in order to generate a transcript of the speech data from the original audio file or stream. Additionally, a shadowing process may be performed in order to dub over the speech data (or a portion of the speech data) from the original audio file or stream for language translation or coherence (i.e., an original speaker is not coherent) purposes. A shadowing process may produce an audio file or stream that differs from an original audio file or stream (e.g., differences in pauses between words, utterances and phrases, differences in emotional representation and intonation, etc). System 2 allows for captioning and dubbing an audio stream or file in a same language. Alternatively, system 2 allows for captioning and dubbing an audio stream or file from one language and translating the audio stream or file into another language. System 2 is used to correct the following problems that may occur during a shadowing and dubbing process:

1. When performing a shadowing process, a person that respeaks the original audio steam or file may need to pause and then re-start. This may create a discontinuity (pause) in the audio.
2. When performing a shadowing process, a person that respeaks the original audio steam or file may discover that they have repeated a particular word incorrectly.
3. When performing a shadowing process, a person that respeaks the original audio steam or file may speak in a relatively monotonous, intonation-free tone voice.

System 2 of FIG. 1 comprises a computing apparatus 9, an original audio file/stream 5a, a shadow/dubbed audio file/stream 5b, an enhanced audio file/stream 5c, a transcription audio file/stream 5d, and a text transcription 11 connected to a computing system 10 through a network 7. Network 7 may comprise any type of network including, inter alia, a local area network, (LAN), a wide area network (WAN), the Internet, etc. Original audio file/stream 5a, shadow/dubbed audio file/stream 5b, enhanced audio file/stream 5c, transcription audio file/stream 5d, and text transcription 11 may each be comprised by a computer, a database, a repository, etc. Computing apparatus 9 is used by a speaker that is shadowing an original speaker. Computing apparatus 9 may comprise, inter alia, a personal computer, a laptop computer, a computer terminal, a telephone, etc. Computing apparatus 9 may comprise a single computing apparatus or a plurality of computing apparatuses. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises an audio transformation software application 18 and repository 17. Repository 17 may be located internal to memory system 14 or external to memory system 14. Repository 17 may be a database. Repository 17 comprises audio/text/video data generated and/or synchronized by audio transformation software application 18. Audio transformation software application 18 may comprise a plurality of software modules (as described with respect to FIG. 2, infra) for accepting multiple audio files (i.e., original audio file/stream 5a and shadow/dubbed audio file/stream 5b) and generating enhanced audio file/stream 5c, transcription audio file/stream 5d, and text transcription 11.

Audio transformation software application 18 allows for the following audio synchronization steps to be performed:
1. A shadower retrieves (and plays) original audio file/stream 5a.
2. The shadower re-speaks and interacts (e.g., advancing, playing back, etc) with original audio file/stream 5a.
3. Original audio file/stream 5a is modified as a result of the shadower's interaction with original audio file/stream 5a.
4. Audio transformation software application 18 analyzes original audio file/stream 5a, shadow/dubbed audio file/stream 5b, and editing interfaces.
5. Audio transformation software application 18 executes an algorithm (s) (e.g., the algorithms of FIGS. 3-4) to detect events and applies rules to the events in order to generate presentation audio files (e.g., enhanced audio file/stream 5c, transcription audio file/stream 5d, and text transcription 11).
6. The algorithm(s) is used to process two sources of audio:
   A. Audio produced by the original speaker (e.g., original audio file/stream 5a).
   B. Audio produced by a shadower or dubbing individual (e.g., shadow/dubbed audio file/stream 5b).

Events may include:
1. Repeated phrases spoken by the shadower
2. Pauses spoken by the shadower.
3. Repeated phrases spoken by the original speaker (shadower does not repeat the repeated phrase).
4. The original speaker speaks slowly.
5. The shadower speaks slowly.
6. The shadower replaying portions of the original audio.
7. The shadower speaking in a monotone voice.
8. An intonation of the original speaker.
9. A semantic beginning and end of a phrase(s).
10. Intonation boundaries.
11. System 2 may observe a cursor and a mouse of the shadower and is able to detect which portions of text that the shadower is editing and a timing of that portion.

Rules may include:
1. In a case where pauses are found in the shadowed speech (e.g., shadow/dubbed audio file/stream 5b) that are not matched by pauses in the original speech (e.g., original audio file/stream 5a), the pauses will be removed and the audio concatenated and smoothed (i.e., by audio transformation software application 18).
2. In a case where a shadower repeats phrases that are not repeated in the original audio, audio transformation software application 18 will choose a better instantiation and remove repetition.
3. In a case where the shadower repeats a fragment of a phrase, audio transformation software application 18 will replace and insert just a corrected word in a phrase. For example, a shadower says "He will go to the store in the morning" and then self-corrects, clicking on the errant text "to the store" and says a corrected phrase "to school". Based on a cursor location, audio transformation software application 18 will know where to insert the corrected phrase.
4. Audio transformation software application 18 may synchronize original audio (e.g., original audio file/stream 5a), shadowing audio (e.g., shadow/dubbed audio file/stream 5b), and a shadower's editing interface.
5. Audio transformation software application 18 may identify emotion and add emotions where needed.
6. In the event of a mismatch between the original speaker and the shadower, audio transformation software application 18 may enhance "emotional markers" to better match the original audio.

Audio transformation software application 18 may incorporate expressive text-to-speech synthesis for the human language where phrases that a shadower uses to create the text (e.g., an exclamation mark, a period, etc) are stripped. Additionally, audio transformation software application 18 allows a shadower to add phrases to help with the "emotion insertion." For example, the shadower may say "sad phrase", "excited phrase," etc. These phrases will then be stripped out, but may be used to help add in "emotion prosody" later. Text analytics may also be used to determine emotion insertion.

For example, a phrase that starts with "I am really sorry that X occurred" will signal a "sorry" emotion and a phrase in the text "He won the prize" would signal including a "happy emotion," etc.

Audio transformation software application 18 may include a service which manages all system components. The service functions as follows:
1. A signal is received from a user requesting to access the service.
2. The signal is analyzed to determine the requested service.
3. Full synchronization may be performed or specific audio components based on the user's requests. The extent of synchronization is mediated by the service. For example if the user wishes to synchronize all emotional intonations but not pauses, the service may mediate the interaction.
4. Audio transformation software application 18 monitors original speech and advises corrections which may be made automatically or by the shadower.
5. The service is completed by recording billing charges based on the service, notifying user of the incurred charges, and providing for payment of incurred charges.

Audio transformation software application 18 performs a transformation process that includes synchronizing original audio file/stream 5a and shadow/dubbed audio file/stream 5b in order to generate enhanced audio file/stream 5c and transcription audio file/stream 5d. Enhanced audio file/stream 5c comprises a dubbed audio file (i.e., used by users who would like to retrieve content (e.g., a lecture) by listening to audio) associated with original audio file/stream 5a. The dubbed audio file is necessary in cases when the quality of original audio file/stream 5a is not possible to use (e.g. original audio file/stream 5a comprises noise, original audio file/stream 5a is spoken by a person with an accent, etc). Transcription audio file/stream 5d is generated for processing through an automatic transcription system in order to generate a high quality transcription (i.e., comprising text) that may be watched by users (who prefer to read transcription of the lecture rather than to listening audio only).

Audio transformation software application 18:
1. Transforms dubbed audio (e.g., shadow/dubbed audio file/stream 5b) into audio (e.g., enhanced audio file/stream 5c) that may be listened to.
2. Uses original audio file/stream 5a to add emotion and verify pauses and repetition for shadow/dubbed audio file/stream 5b.

Audio transformation software application 18 performs the following process for generating enhanced audio file/stream 5c, transcription audio file/stream 5d, and text transcription 11:
1. Original audio file/stream 5a is retrieved (i.e., with all of its faults).
2. A shadower converts original audio file/stream 5a into shadow/dubbed audio file/stream 5b. Shadow/dubbed audio file/stream 5b typically comprises a monotone audio file with decoding errors. Additionally, shadow/dubbed audio file/stream 5b may comprise such words as period, exclamation point, comma, question-mark, etc. in order to appropriate punctuation into a transcription.
3. Enhanced audio file/stream 5c is generated using original audio file/stream 5a and shadow/dubbed audio file/stream 5b. Original audio file/stream 5a may be used as input to transform and further modify shadow/dubbed audio file/stream 5b. For example, emotions may be detected in original audio file/stream 5a and added into shadow/dubbed audio file/stream 5b thereby generating enhanced audio file/stream 5c. Enhanced audio file/stream 5c comprises clean speech that has been dubbed (shadowed):
   A. Without accent.
   B. With added emotions.
   C. Without pauses or commands.
4. Transcription audio file/stream 5d comprises audio used to generate a text transcription 11. Audio transformation software application 18 uses transcription audio file/stream 5d to generate text with comas, periods, question marks, exclamation points etc.
5. Text transcription 11 may be aligned with slides or movie (for close caption purposes).

Figure 2:
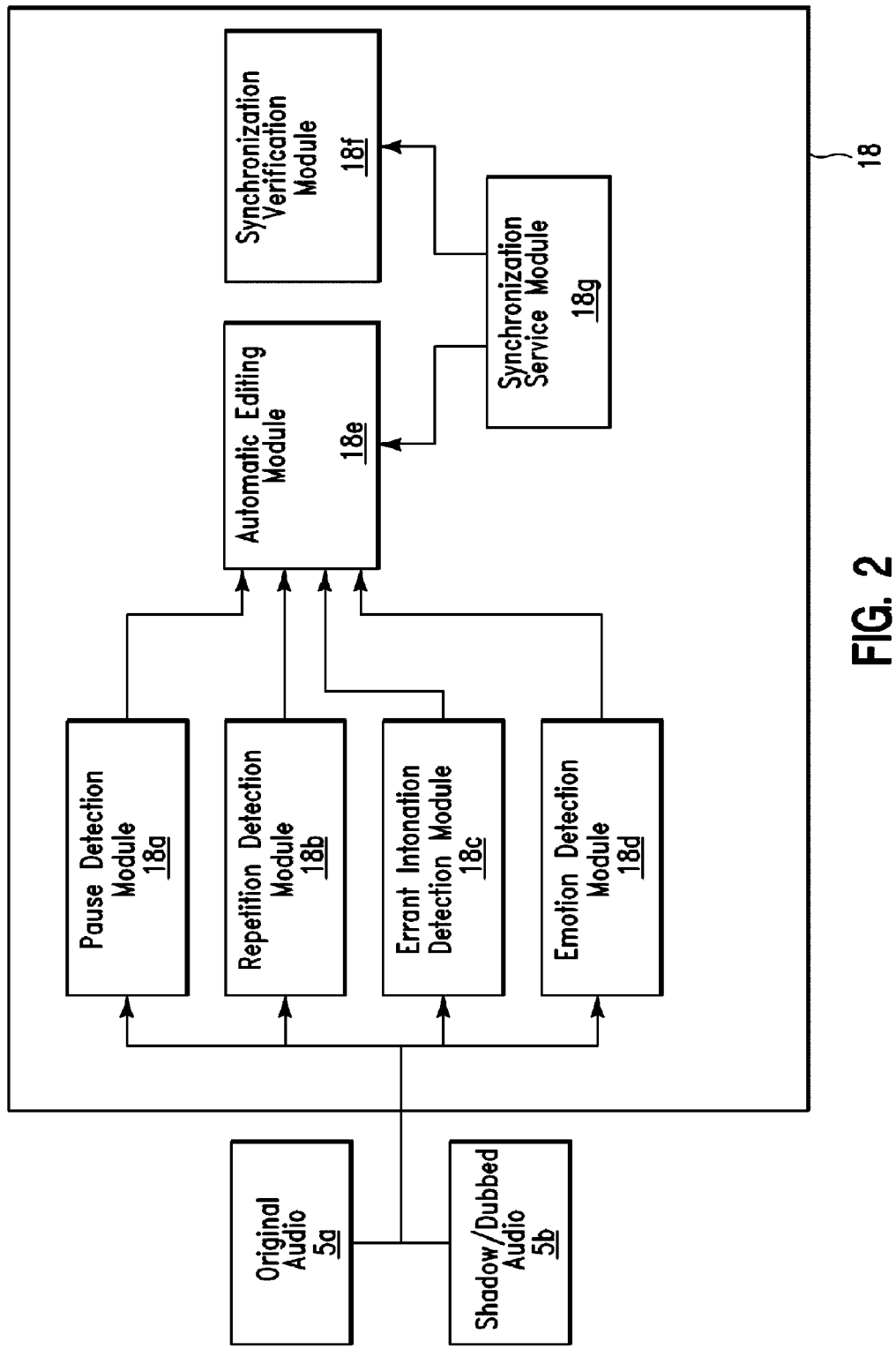
FIG. 2 illustrates an internal block diagram view of the audio transformation software application of FIG. 1, in accordance with embodiments of the present invention.

FIG. 2 illustrates an internal block diagram view of audio transformation software application 18, in accordance with embodiments of the present invention. Audio transformation software application 18 comprises a plurality of software modules:
1. Pause detection module 18a.
2. Repetition detection module 18b.
3. Errant intonation detection module 18c.
4. Emotion detection module 18d.
5. Automatic editing module 18e.
6. Synchronization verification module 18f.
7. Synchronization service module 18g.

Pause detection module 18a, repetition detection module 18b, errant intonation detection module 18c, and emotion detection module 18d detect misalignment errors between original audio file/stream 5a and shadow/dubbed audio file/stream 5b. Misalignment errors may include, inter alia, a length of pauses and a repetition of words, phrases, and utterances. Pause detection module 18a compares original audio file/stream 5a and shadow/dubbed audio file/stream 5b for length of pauses and directs the automatic editing module 18e to add or remove silence to create the necessary pause length. Repetition detection module 18b identifies repeated words, phrases, and utterances in both original audio file/stream 5a and shadow/dubbed audio file/stream 5b and directs automatic editing module 18e to remove or repeat the identified word, phrase, or utterance. Errant intonation detection module 18c compares the vocal intonation of original audio file/stream 5a with shadow/dubbed audio file/stream 5b and directs the automatic editing module 18e to change tones of the dubbed voice. For example, if original audio file/stream 5a comprises a question where the intonation raises at the end of the question, but shadow/dubbed audio file/stream 5b does not, errant intonation detection module 18c enables automatic editing module to make the necessary changes. Emotion detection module 18d compares emotional cues in original audio file/stream 5a and shadow/dubbed audio file/stream 5b and directs necessary changes. For example, if the original audio file/stream 5a comprises a sad expression and intonation and shadow/dubbed audio file/stream 5b is cheery, emotion detection module 18d will direct automatic editing system 18e to change shadow/dubbed audio file/stream 5b so it closely resembles original audio file/stream 5a. Synchronization service module 18g and synchronization verification module 18f in combination align original audio file/stream 5a with shadow/dubbed audio file/stream 5b in order to align with text and other visual information given in a presentation.

Figure 3:
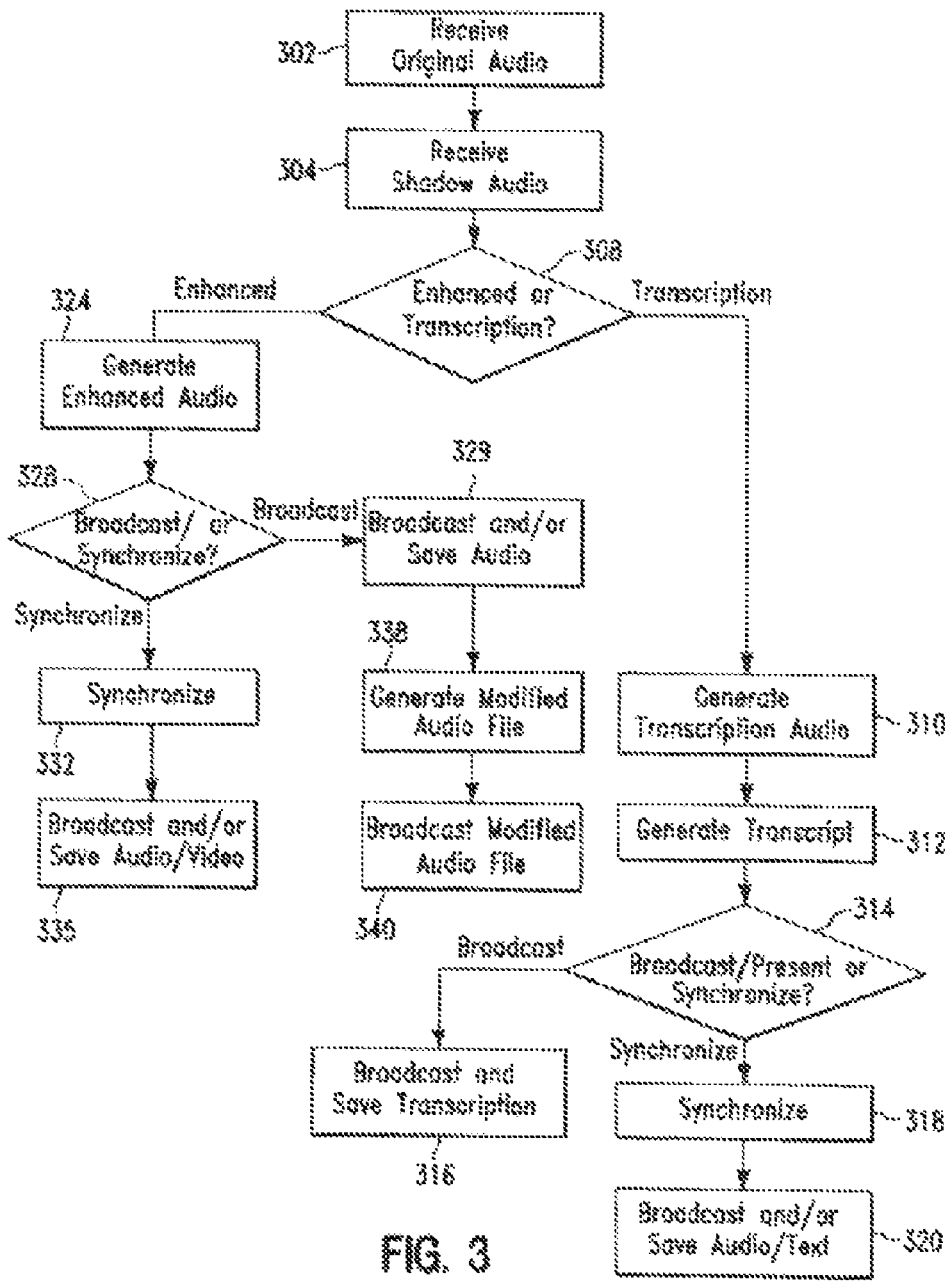
FIG. 3 illustrates an algorithm describing a process used by the system of FIG. 1 for processing multiple audio files, in accordance with embodiments of the present invention.

FIG. 3 illustrates an algorithm describing a process used by system 2 of FIG. 1 for processing multiple audio files, in accordance with embodiments of the present invention. In step 302, a computing system (e.g., computing system 10 in FIG. 1) receives an original audio file (e.g., original audio stream/file 5a in FIG. 1) from a first audio source. The first audio file is generated from a first audio signal. The first audio file includes first speech data associated with a first party. In step 304, the computing system receives a shadow/dubbed audio file (e.g., shadow/dubbed audio file/stream 5b of FIG.

1) from a second audio source. The shadow/dubbed audio file includes second speech data associated with a second party. In step 308, it is determined if an enhanced audio file (e.g., enhanced audio file/stream 5c of FIG. 1) or a transcription audio file (e.g., transcription audio file/stream 5d of FIG. 1) will be generated.

If in step 308, it is determined that an enhanced audio file will be generated then in step 324, an enhanced audio file is generated. In step 328, it is determined if the enhanced audio file will be broadcasted or synchronized (e.g., with video such as, inter alia, slides, pictures, etc). If in step 328, it is determined that the enhanced audio file will be broadcasted then in step 329, the computing system broadcasts for a viewer (and stores) the enhanced audio file. In step 338 (after broadcasting the enhanced audio file), the computing system generates a modified audio file from the original audio file and the shadow/dubbed audio file. The modified audio file differs from the original audio file, the shadow/dubbed audio file, and the enhanced audio file. The modified audio file includes a modified version of the original audio file and a modified version of the shadow/dubbed audio file. In step 340, the computing system broadcasts the modified audio file. Broadcasting the modified audio file may include simultaneously broadcasting the modified version of the original audio file at a first audible level and the modified version of the shadow/dubbed audio file at a second audible level. The first audible level differs from the second audible level. The first audible level may differ from the second audible level in order to present events (e.g., emotions) and apply rules (e.g., describing different emotions) to the events in order to generate presentation audio files (e.g., the modified audio file) as described, infra, with respect to FIG. 1. Additionally, the modified version of said original audio file may include a first language and the modified version of the shadow/dubbed audio file may include a second language differing from the first language. If in step 328, it is determined that the enhanced audio file will be synchronized then in step 332, the enhanced audio file is synchronized with a video file to generate a synchronized audio/video file. For example, portions of the enhanced audio file may be synchronized with associated slides or pictures. In step 335, the synchronized audio/video file is broadcasted (and stored) for a viewer.

If in step 308, it is determined that a transcription audio file will be generated then in step 310, a transcription audio file is generated. In step 312, a transcript is generated from the transcription audio file. In step 314, it is determined if the transcript will be broadcasted or synchronized (e.g., with video such as, inter alia, slides, pictures, etc). If in step 314, it is determined that the transcript will be broadcasted then in step 316, the computing system broadcasts for a viewer (and stores) the transcript. If in step 314, it is determined that the transcript will be synchronized then in step 318, the transcript is synchronized with a video file to generate a synchronized text/video file (e.g., a captioned text slide show). For example, portions of the text transcript may be synchronized with associated slides or pictures. In step 320, the synchronized text/video file is broadcasted (and stored) for a viewer.

Figure 4:
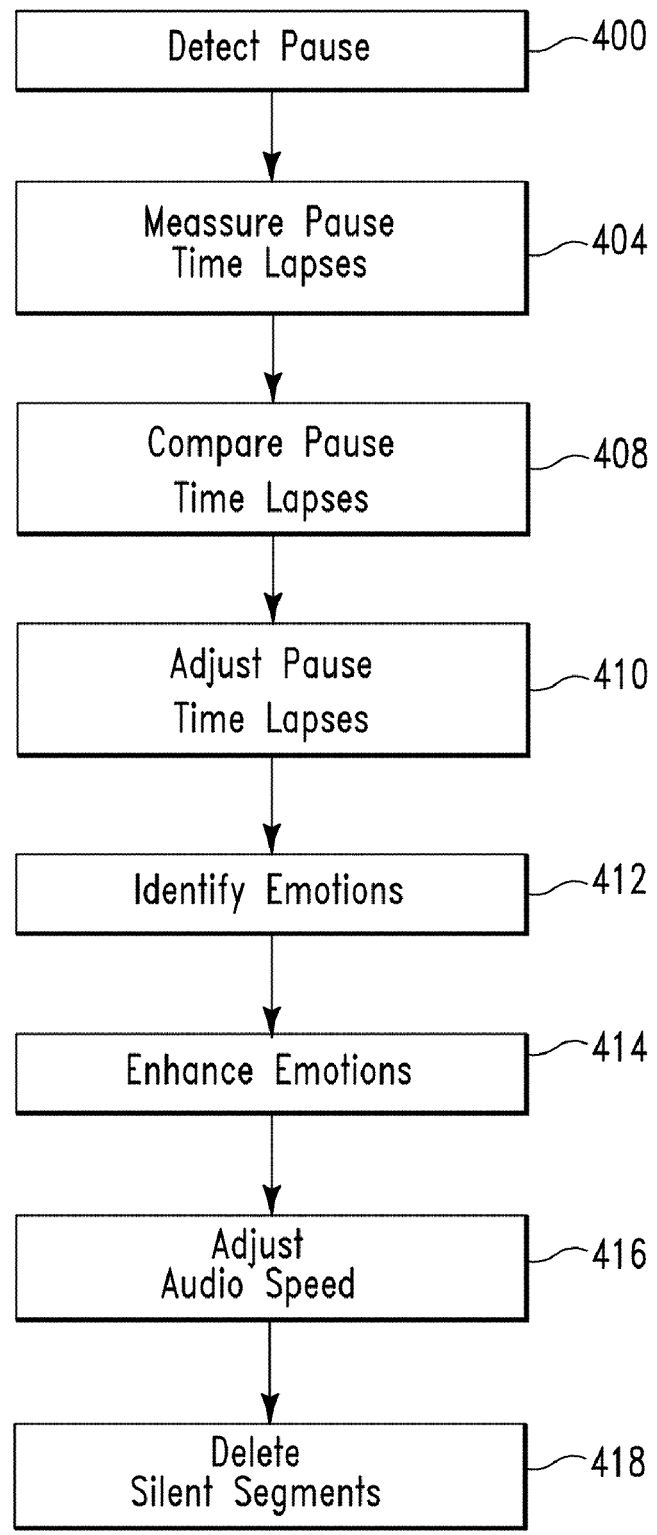
FIG. 4 illustrates an algorithm describing a process used by the audio transformation software application of FIG. 1 for synchronizing emotions and pauses, in accordance with embodiments of the present invention.

FIG. 4 illustrates an algorithm describing a process used by audio transformation software application 18 of FIG. 1 for synchronizing emotions and pauses, in accordance with embodiments of the present invention. In step 400, audio transformation software application 18 detects pauses in an original audio file and a shadow/dubbed audio file. In step 404, the pauses are measured by a timer. In step 408, audio transformation software application 18 compares time lapses between the original audio file and the shadow/dubbed audio file and performs an audio enhancement to adjust the pauses.

In step 412, audio transformation software application 18 identifies events of expressed emotion. In step 414, audio transformation software application 18 performs an enhancement process to align (emotions of) the original audio file with the shadow/dubbed audio file. In step 416, a speed of the shadow/dubbed audio file is adjusted. In step 418, any silent segments present in shadow/dubbed audio file are deleted.

Figure 5:
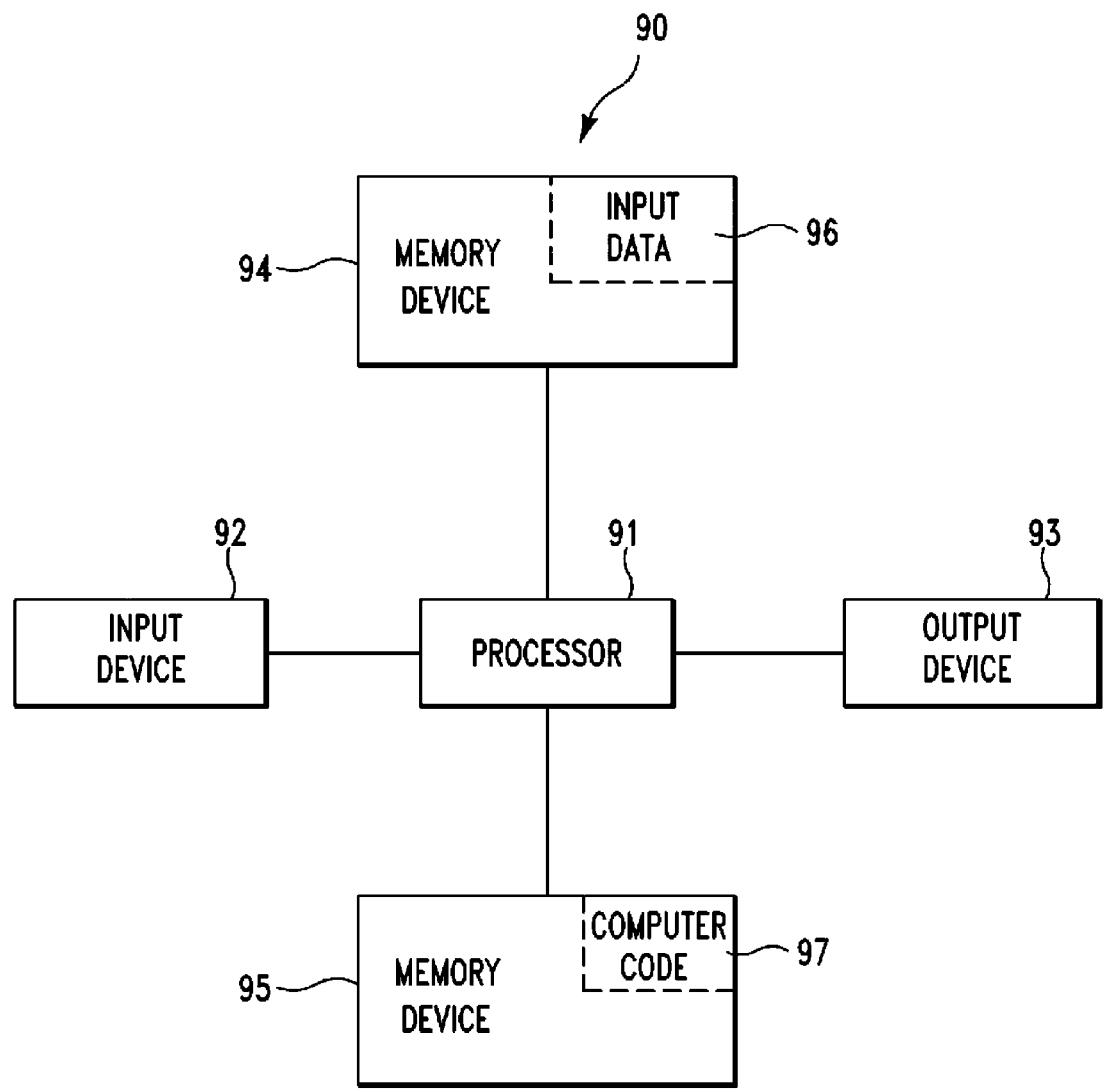
FIG. 5 illustrates a computer system used for processing multiple audio files, in accordance with embodiments of the present invention.

FIG. 5 illustrates a computer system 90 used for processing multiple audio files, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for processing multiple audio files (e.g., the algorithms of FIGS. 3 and 4). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to process multiple audio files. Thus the present invention discloses a process for deploying or integrating computing infrastructure, comprising integrating computer-readable code into the computer system 90, wherein the code in combination with the computer system 90 is capable of performing a method for processing multiple audio files. In another embodiment, the invention provides a business method that performs the process steps of the invention on a subscription, advertising, and/or fee basis. That is, a service provider, such as a Solution Integrator, could offer to process multiple audio files. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
    receiving, by a computing system from a first audio source, a first audio file, wherein said first audio file comprises an original audio file, wherein said first audio file is generated from a first audio signal, and wherein said first audio file comprises first speech data associated with a first party;
    receiving, by said computing system from a second audio source, a second audio file associated with said first audio file, wherein said second audio file is generated from said first audio signal, wherein said first audio source differs from said second audio source, wherein said first audio file differs from said second audio file, and wherein said second audio file comprises second speech data associated with a second party;
    after receiving said first audio file and said second audio file, generating by said computing system, a third audio file, wherein said third audio file is generated from said second audio file, wherein said third audio file differs from said second audio file, wherein said generating said third audio file comprises identifying a first set of attributes missing from said second audio file and adding said first set of attributes to said second audio file, wherein said generating said third audio file comprises removing a second set of attributes from said second audio file, wherein said third audio file comprises third speech data associated with said second party, wherein generating said third audio file further comprises:
        detecting and measuring pauses within said first audio file and said second audio file;
        based on results of said detecting and measuring pauses, comparing time lapses between said first audio file and said second audio file;
        performing an audio enhancement process to adjust said pauses;
        identifying events of expressed emotions;
        aligning said events of expressed emotions with said first audio file and associated content of the second audio file;
        in response to results of said aligning, adjusting a speed of the second audio file;
        identifying repeated words in said first audio file and said second audio file;
        removing said repeated words from said first audio file and said second audio file; and
        deleting any silent segments present in said second audio file; and
    broadcasting, by said computing system, said third audio file.

2. The method of claim 1, wherein said third audio file is further generated from said first audio file, wherein said third audio file differs from said first audio file, wherein said third speech data associated is further associated with said first party, and wherein said first set of attributes are retrieved from said first audio file.

3. The method of claim 2, further comprising:
    after said receiving said first audio file and said second audio file, generating by said computing system, a fourth audio file, wherein said fourth audio file is generated from said first audio file said second audio file, wherein said fourth audio file differs from said first audio file, said second audio file, and said third audio file, and wherein said fourth audio file comprises fourth speech data associated with said first party and said second party;
    generating, by said computing system from said fourth audio file, a first text transcript comprising first text data associated with said fourth audio file; and
    storing, by said computing system, said first text transcript.

4. The method of claim 3, further comprising:
    receiving, by said computing system, video data associated with said fourth audio file;
    synchronizing, by said computing system, portions of said video data with associated portions of said fourth audio file;
    generating, by said computing system in response to said synchronizing, a synchronized audio/video file comprising said portions of said video data synchronized with said associated portions of said fourth audio file; and
    broadcasting, by said computing system, said synchronized audio/video file.

5. The method of claim 2, further comprising:
    after said broadcasting said third audio file, generating by said computing system, a fourth audio file, wherein said fourth audio file is generated from said first audio file said second audio file, wherein said fourth audio file differs from said first audio file, said second audio file, and said third audio file, and wherein said fourth audio file comprises a modified version of said first audio file and a modified version of said second audio file; and
    broadcasting, by said computing system, said fourth audio file, wherein said broadcasting said fourth audio file comprises simultaneously broadcasting said modified version of said first audio file at a first audible level and said modified version of said second audio file at a second audible level, and wherein said first audible level differs from said second audible level.

6. The method of claim 5, wherein said modified version of said first audio file comprises a first language, wherein said modified version of said second audio file comprises a second language, and wherein said first language differs from said second language.

7. The method of claim 2, further comprising:
    after said broadcasting said third audio file, generating by said computing system, a fourth audio file, wherein said fourth audio file is generated from said first audio file said second audio file, wherein said fourth audio file differs from said first audio file, said second audio file, and said third audio file, and wherein said fourth audio file comprises portions of said first audio file and portions of said second audio file; and
    broadcasting, by said computing system, said fourth audio file.

8. The method of claim 1, further comprising:
    after said receiving said first audio file and said second audio file, generating by said computing system, a fourth audio file, wherein said fourth audio file is generated from said second audio file, wherein said fourth audio file differs from said first audio file, said second audio file, and said third audio file, and wherein said fourth audio file comprises fourth speech data associated with said second party;
    generating, by said computing system from said fourth audio file, a first text transcript comprising first text data associated with said fourth audio file; and
    storing, by said computing system, said first text transcript.

9. The method of claim 8, further comprising:
receiving, by said computing system, video data associated with said fourth audio file;
synchronizing, by said computing system, portions of said video data with associated portions of said fourth audio file;
generating, by said computing system in response to said synchronizing, a synchronized audio/video file comprising said portions of said video data synchronized with said associated portions of said fourth audio file; and
broadcasting, by said computing system, said synchronized audio/video file.

10. The method of claim 1, further comprising:
generating, by said computing system from said second audio file, a first text transcript comprising first text data associated with said second audio file; and
storing, by said computing system, said first text transcript.

11. The method of claim 10, further comprising:
receiving, by said computing system, video data associated with said second audio file;
synchronizing, by said computing system, portions of said video data with associated portions of said second audio file;
generating, by said computing system in response to said synchronizing, a synchronized audio/video file comprising said portions of said video data synchronized with said associated portions of said second audio file; and
broadcasting, by said computing system, said synchronized audio/video file.

12. The method of claim 1, wherein said first set of attributes comprises attributes associated with human emotions.

13. The method of claim 1, wherein said second set of attributes comprises attributes selected from the group consisting of discontinuities between words in said second audio file and incorrect words in said second audio file.

14. The method of claim 1, further comprising:
adjusting, by said computing system, a speed of said broadcasting said third audio file.

15. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

16. A computer program product, comprising a computer storage medium comprising a computer readable program code embodied therein, said computer readable program code configured to perform the method of claim 1 upon being executed by a processor of a computing system.

17. A computing system comprising a processor coupled to a computer-readable memory unit, said memory unit comprising instructions that when executed by the processor implement an audio file generation method, said method comprising:
receiving, by said computing system from a first audio source, a first audio file, wherein said first audio file comprises an original audio file, wherein said first audio file is generated from a first audio signal, and wherein said first audio file comprises first speech data associated with a first party;
receiving, by said computing system from a second audio source, a second audio file associated with said first audio file, wherein said second audio file is generated from said first audio signal, wherein said first audio source differs from said second audio source, wherein said first audio file differs from said second audio file, and wherein said second audio file comprises second speech data associated with a second party;
after receiving said first audio file and said second audio file, generating by said computing system, a third audio file, wherein said third audio file is generated from said second audio file, wherein said third audio file differs from said second audio file, wherein said generating said third audio file comprises identifying a first set of attributes missing from said second audio file and adding said first set of attributes to said second audio file, wherein said generating said third audio file comprises removing a second set of attributes from said second audio file, and wherein said third audio file comprises third speech data associated with said second party, wherein generating said third audio file further comprises:
detecting and measuring pauses within said first audio file and said second audio file;
based on results of said detecting and measuring pauses, comparing time lapses between said first audio file and said second audio file;
performing an audio enhancement process to adjust said pauses;
identifying events of expressed emotions;
aligning said events of expressed emotions with said first audio file and associated content of the second audio file;
in response to results of said aligning, adjusting a speed of the second audio file;
identifying repeated words in said first audio file and said second audio file;
removing said repeated words from said first audio file and said second audio file; and
deleting any silent segments present in said second audio file; and
broadcasting, by said computing system, said third audio file.

18. The computing system of claim 17, wherein said third audio file is further generated from said first audio file, wherein said third audio file differs from said first audio file, wherein said third speech data associated is further associated with said first party, and wherein said first set of attributes are retrieved from said first audio file.

19. The computing system of claim 18, wherein said method further comprises:
after said receiving said first audio file and said second audio file, generating by said computing system, a fourth audio file, wherein said fourth audio file is generated from said first audio file said second audio file, wherein said fourth audio file differs from said first audio file, said second audio file, and said third audio file, and wherein said fourth audio file comprises fourth speech data associated with said first party and said second party;
generating, by said computing system from said fourth audio file, a first text transcript comprising first text data associated with said fourth audio file; and
storing, by said computing system, said first text transcript.

20. The computing system of claim 19, wherein said method further comprises:
receiving, by said computing system, video data associated with said fourth audio file;
synchronizing, by said computing system, portions of said video data with associated portions of said fourth audio file;

generating, by said computing system in response to said synchronizing, a synchronized audio/video file comprising said portions of said video data synchronized with said associated portions of said fourth audio file; and broadcasting, by said computing system, said synchronized audio/video file.

* * * * *